BEST AVAILABLE COPY
C. Duneau,
Making Pottery.
Patented Oct. 27, 1835.
No. 9.196 x
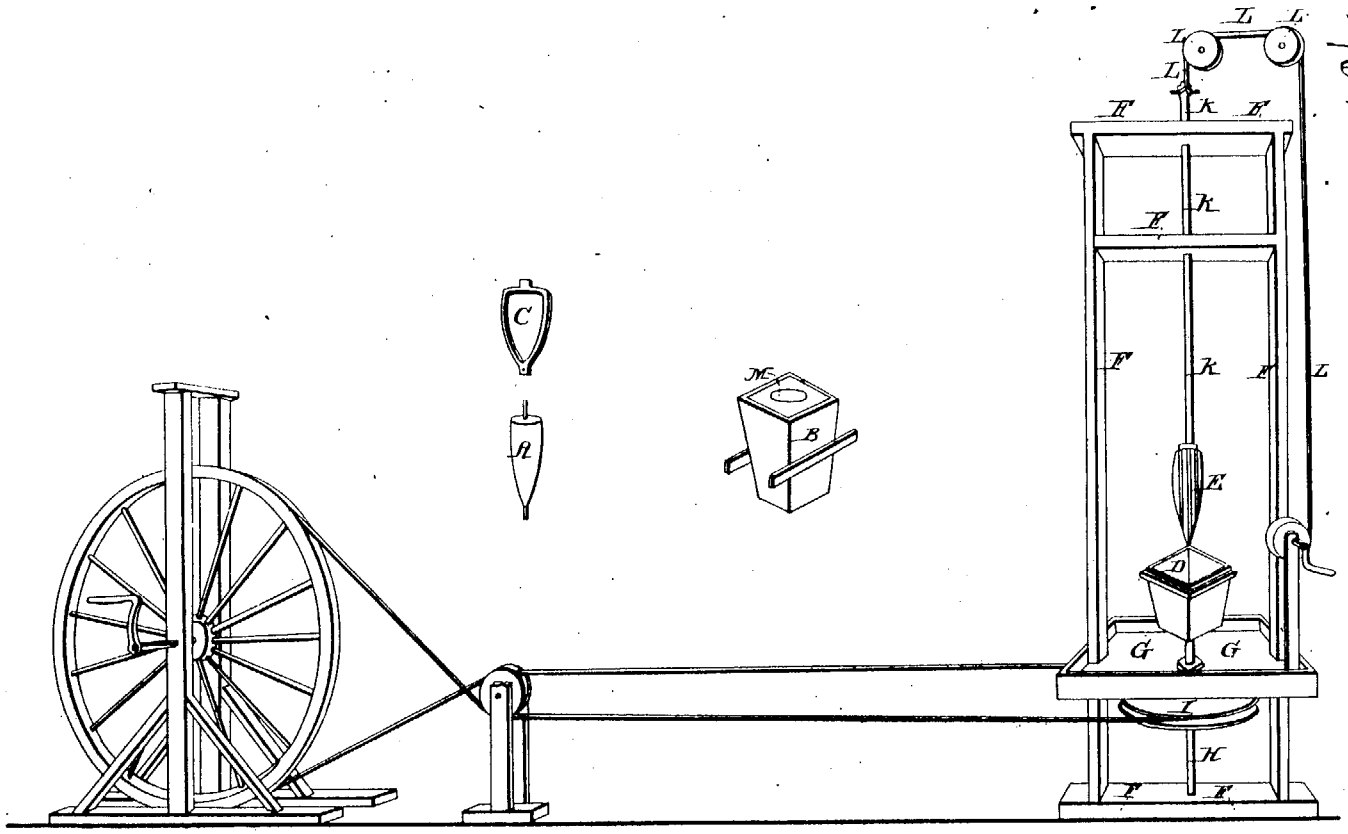
AM. PHOTO-LITHO. CO. N.Y. (OSBORNE'S PROCESS)

Oct. 27. 1835 9196 X 101.

Charles Duneau. (Patented 27 oct. 1835)
Letters Patent.

The Schedule referred to in these Letters Patent and making
part of the same containing a description in the words of the said
Charles Duncan himself of his improvement in the Machine
for making Moulds for Loaf Sugar and other Substances.

---

To all to whom these Presents shall or may come.

Be it known that I Charles Duneau of the County of Kings and
State of New York have invented a new and useful machine for preparing
and making moulds for loaf and other sugar and other substances, and
that the following is a full and exact description thereof, and of the
mode of constructing and using the same reference being made by the
Letters of the Alphabet to a plan or drawing of the said machine, which
I the said Charles Duncan have annexed to this specification & which
forms a part thereof; that is to say, the said machine consists of and
is formed by a model, which is made and constructed of wood, metal,
or other hard substance in the shape and form of the mould to be
made and prepared. A small wire or spike projects perpendicularly
from the centre of each extremity of the said model. The said model
is represented in the said drawing by the figure marked by the letter
A and of and by a flat frame, which is made and constructed
of wood, metal, or other hard substance corresponding in shape and
dimensions with the said model. The said flat frame is represented
in the said drawing by the figure marked by the letter C, and of and
by a box or case, which is made and constructed of wood, metal or
other hard substance of such size and dimensions, that the
said model may stand upon the bottom of, and within the
same, leaving a sufficient space within the same, round the said
model, for the purposes hereinafter mentioned and described; a suf-
ficient hole is bored or cut in the centre of the bottom of the said box
or case for the wire or spike in and at the smaller end of the said
model to stand in; the said box or case is represented in the said

9196X drawing by the figure marked by the letter B, and of and by a chuck, which is made and constructed of wood, metal, or other hard substance of such shape and dimensions as to receive and firmly retain within it the lower part of the said case or box; the said chuck is represented in the said drawing by the figure marked by the letter D, and of & by a drill, which is made and constructed of wood, metal, other hard substance of a convex form, corresponding to, and being the reverse of the concave form of the mould or moulds to be prepared & made as hereinafter described; the surface of the said drill is indented by grooves running in right lines from the larger to the smaller end of the said drill, at convenient distances according to the size of the said drill, and sufficiently wide and deep to receive the superfluities hereinafter mentioned; in the centre of the smaller end of the said drill, a sufficient hole is bored or cut, to admit the spike or wire projecting from the larger end of the said model; the said drill is represented in the said drawing by the figure marked by the letter E, and of and by an upright frame, which is made and constructed of wood, metal, or other hard substance, and consists of, and is formed by as many upright and horizontal bars as may be requisite and necessary. At a convenient distance above the lower end of the said frame, a small platform of wood, metal, or other hard substance is securely fastened to, and forms a part of the said frame. The said frame last mentioned is represented in the said drawing by the figure marked by the letters F, F, F, F, F, F, F, and the said platform by the figures marked by the letters G, G; and of and by a shaft or axle which is made and constructed of wood, metal, or other hard substance, and which passes perpendicularly through, and revolves freely within a sufficient collar in the centre of said platform, and the lower extremity whereof rests in, and revolves freely, within a sufficient collar or bearing in a horizontal bar of the said frame, the said shaft or axle is represented in the said drawing by the figure marked by the letters H, H.

The centre of the bottom of the said chuck is securely screwed, or otherwise fastened to the upper extremity of the said shaft or axle, so that the said chuck may stand perpendicularly thereon as represented in the said drawing. The larger extremity of said drill is securely fastened to and suspended from a perpendicular bar, chain, rope or other convenient means of suspension, passing through a horizontal bar or bars of the said upright frame, so that a perpendicular right line drawn through the centre of each of the extremities of the said drill, will pass through the centre of the bottom of the said chuck; the said bar, chain, rope, or other means of suspension is represented in the said drawing by the figures marked by the letters K, K, K. To the upper end of the said bar, chain, rope, or other means of suspension, is securely fastened a cord, chain or rope, hanging over a pully or pullies, and terminating on, and wound at pleasure by a crank or otherwise, however secured so as to lower, raise and retain at any elevation that may be required; the said drill, the said cord, chain or rope last mentioned, and the said pullies and crank are represented in the said drawings by the figures marked by the letters L, L, L, L, L, L.

A wheel or pully made and constructed of wood, metal, or other hard substance, may be securely fastened by means of a sufficient hole in the centre thereof to the said shaft or axle, and force or power may be applied to the said machine by means of a connecting strap or cord, as represented in the said drawing, passing round the said wheel or pully, last mentioned; but such force or power may be applied otherwise, howsoever, so as to cause the said shaft or axle to revolve in the collars thereof aforesaid. The said wheel or pully last mentioned is represented in the said drawing by the figure marked by the letter I. For the purpose of using and putting into operation the said machine, the said box or case (represented in the said drawing by the figure marked by the letter B) is placed in the said chuck (represented in the said drawing by the figure marked by the letter D) the said model (represented in the said drawing by the figure marked by the letter A) is placed in the said box or case, so that the said spike or wire projecting from the smaller end of the said model, may stand perpendicularly in the

9196 X said hole in the bottom of the said box or case, the said drill
(represented in the said drawing by the figure marked by the
letter E,) is then let down until the said spike or wire in the larger ex-
-tremity of the said mould is admitted and received into the said
hole in the smaller extremity of the said drill. Liquid Plaster of Paris,
or other convenient composition or matter, is then poured into the
said box or case, so as to cover the sides or convex part of the said mo-
del, and to fill the space in the said box or case round the said
model. As soon as the said Plaster of Paris, or other composition or
matter, has become hard and solid, the said model is taken out of
the same, and a concave model or figure is discovered in the said
Plaster of Paris or other composition or matter corresponding to and the
reverse of the convex form or figure of the said model. The said con-
cave model or figure is represented in the said drawing by the fig-
ure maked by the letter M, and which is contained within the
aforesaid figure marked by the letter B. Potter's earth or clay prepar-
ed as Potters prepare earth or clay, or other proper and convenient
composition or matter and placed within the said flat frame up-
on some smooth surface. Two pieces of said earth or clay or other
matter or composition, shaped by, and corresponding to the figure of
the said flat frame, and somewhat thicker than the mould to be
formed therefrom as hereinafter mentioned, are then placed in,
and against the sides of the said concave model or figure so as to
join, touch, and cover the concave surface or sides of the said con-
cave model or figure. The said shaft or axle is then made to revolve
within the said collars thereof, by the means hereinbefore mentioned,
so that the said chuck, and the said box or case also revolve with
the said shaft, the said drill is then lowered gradually, until it is
sufficiently within the said potter's earth or clay, or other composition
or matter; and the said box or case, with the said concave model or
figure, and the said Potter's earth or clay or other composition or matter,
as the case, may be as caused to revolve until the said drill has made
the interior concave surface of the said Potter's earth or clay or other composition or matter, as the case may be, perfectly smooth, and of a shape, figure and dimensions corresponding to and the reverse of a convex figure, having the shape, figure and dimensions of the the said drill with out any indentations or grooves.

The grooves in the said drill receive the superfluities on the interior, concave surface of the said Potter's earth or clay or other composition or matter, as the case may be. The said Potter's earth or clay or other composition or matter, as the case may be, formed and modelled as aforesaid, on the interior concave surface by the said drill, and on the exterior convex surface by pressure against the said concave models or figures; and when sufficiently hardened by heat, baking or otherwise, is a mould for loaf or other sugar or other substances.

The said machine may be constructed and used with two or more drills, with two or more of the other corresponding several parts; or with two or more boxes or cases, and other corresponding parts to each drill used.

And I, the said Charles Duncan, do say and claim, that I am the original inventer of the said machine hereinbefore described.

In witness whereof, I have hereunto set my hand, the nineteenth day of September, in the year one thousand, eight hundred and thirty-five.

Witnesses
Wm. H. King
E. G. Ryan

Charles Duncan

Exd. W.G.C.

(1824 vide)

(Drawing)